(12) United States Patent
Marocchini et al.

(10) Patent No.: US 10,927,898 B2
(45) Date of Patent: Feb. 23, 2021

(54) COMBINATION SHAFT

(71) Applicant: Hamilton Sundstrand Corporation, Charlotte, NC (US)

(72) Inventors: Francis P. Marocchini, Somers, CT (US); Glenn Gradischer, Canton, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/428,738

(22) Filed: May 31, 2019

(65) Prior Publication Data

US 2020/0378444 A1    Dec. 3, 2020

(51) Int. Cl.
| | |
|---|---|
| *F16D 1/02* | (2006.01) |
| *F16C 3/02* | (2006.01) |
| *F02M 35/10* | (2006.01) |
| *F16K 31/50* | (2006.01) |

(52) U.S. Cl.
CPC .......... *F16D 1/02* (2013.01); *F02M 35/10209* (2013.01); *F16C 3/023* (2013.01); *F16K 31/50* (2013.01)

(58) Field of Classification Search
CPC ..... F16D 1/02; F16C 3/023; F02M 35/10209; F16K 31/50
USPC .......................... 251/266, 267, 273, 274, 291
See application file for complete search history.

(56) References Cited

U.S. PATENT DOCUMENTS

| | | | |
|---|---|---|---|
| 5,060,910 A * | 10/1991 | Iwata | ....................... F16K 31/04 251/129.05 |
| 5,924,276 A | 7/1999 | Mowill | |
| 6,322,282 B1 | 11/2001 | Kussman et al. | |
| 7,610,928 B2 * | 11/2009 | Feldman | .............. F16K 27/0263 137/1 |
| 7,913,973 B1 | 3/2011 | Jansen et al. | |
| 9,863,520 B2 | 1/2018 | Tembreull et al. | |
| 9,874,249 B2 | 1/2018 | Johnson | |
| 2013/0202349 A1 | 8/2013 | Coffin | |

OTHER PUBLICATIONS

Extended European search report issued in corresponding EP application No. 19210468.5, dated Jun. 25, 2020.

* cited by examiner

*Primary Examiner* — John Bastianelli
(74) *Attorney, Agent, or Firm* — Locke Lord LLP; Scott D. Wofsy; Georgi Korobanov

(57) ABSTRACT

A combination shaft including a first shaft including an axial protrusion including a first circumferential surface defining a first outer diameter and a second circumferential surface defining a second outer diameter, and a second shaft having a cavity therein configured to receive at least a portion of the first shaft and being configured to drive an air valve, having internal threads, and defining at least a first inner radial surface having a first inner diameter and a second inner radial surface having second inner diameter, the internal threads being engagable with the external threads to prevent axial movement between the first shaft and the second shaft and the first inner radial surface being engagable with the first outer radial surface and the second inner radial surface being engagable with the second outer radial surface to provide radial centering of the first shaft to the second shaft.

14 Claims, 2 Drawing Sheets

COMBINATION SHAFT

BACKGROUND

Technological Field

The present disclosure relates to combination shafts for valves, and more particularly to combination shafts using a threaded connection.

Description of Related Art

A variety of devices are known in the air valve field. Although threaded connections have been used before in order to mitigate excessive heat transfer, threaded shafts suffer from eccentricity issues. Threaded shafts can also suffer from seizing issues when assembled thru a series of guides/bushing.

The conventional methods and systems have generally been considered satisfactory for their intended purpose. However, there is still a need in the art for threaded connections in hot air areas having improved eccentricity and heat transfer capabilities. There also remains a need in the art for such systems and components that are economically viable. The present disclosure may provide a solution for at least one of these remaining challenges.

SUMMARY OF THE INVENTION

An engine air valve within an engine control system of an aircraft for metering compressor flow to an engine includes a fueldraulic actuator connected to a fuel side of a combination shaft for transmitting power to a poppet valve configured to control airflow within an air inlet duct can include a combination shaft.

A combination shaft for transmitting power includes a first shaft including an axial protrusion including a first circumferential surface defining a first outer diameter and a second circumferential surface defining a second outer diameter, configured to attach to and drive a fuel side piston and a second shaft having a cavity therein configured to receive at least a portion of the first shaft and being configured to drive an air valve, having internal threads, and defining at least a first inner radial surface having a first inner diameter and a second inner radial surface having second inner diameter, the internal threads being engageable with the external threads to prevent axial movement between the first shaft and the second shaft and the first inner radial surface being engageable with the first outer radial surface and the second inner radial surface being engageable with the second outer radial surface to provide radial centering of the first shaft to the second shaft The second shaft can be concentrically aligned within the first shaft.

The first shaft can include a material having a lower melting point than a material of the second shaft and the first shaft includes titanium and the second shaft includes Inconel.

The second outer diameter of the first shaft and the second inner diameter of the second shaft define a clearance of greater than zero and less than 0.0005 inches, also the first outer diameter of the first shaft and the first inner diameter of the second shaft can define a clearance of greater than zero and less than 0.0005 inches.

A locking insert can be located between the first outer diameter of the first shaft and the first inner diameter of the second shaft. The locking insert can include a stainless steel wire.

The second shaft includes a through-hole arranged perpendicular to the primary axis configured to provide cooling to the centering feature.

The protrusion of the shaft includes a first section defining the first outer diameter and a second concentric section defining the second outer diameter configured to fit within the cavity of the second shaft. The cavity of the second shaft can include a first section defining the first inner diameter and a second section defining the second inner diameter. The second inner diameter of the second shaft can be smaller than the first inner diameter of the second shaft. The first outer diameter of the first shaft can be greater than the second outer diameter of the first shaft. The first outer diameter of the first shaft can be separated axially from the second outer diameter of the shaft by the threaded link.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
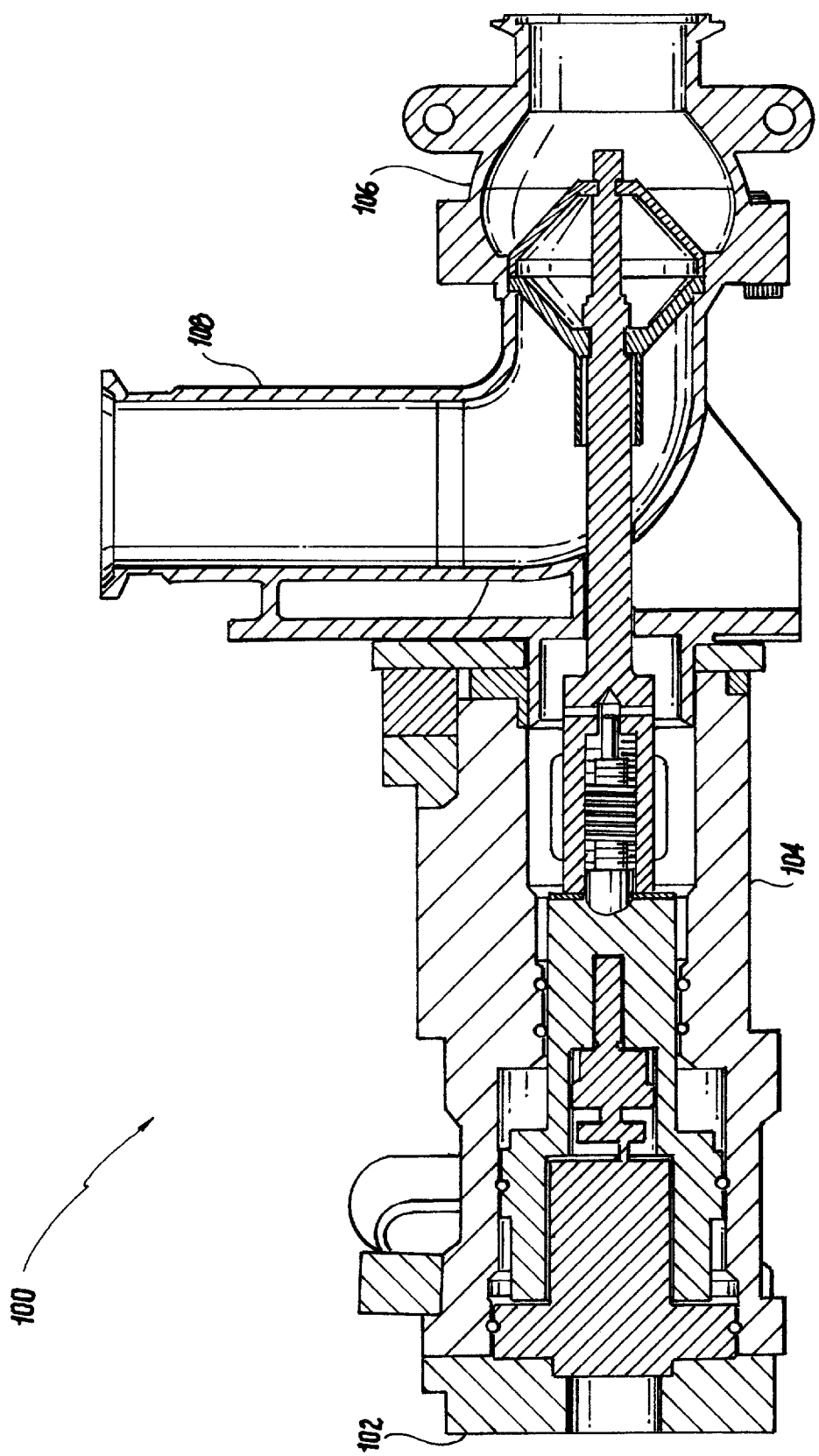
FIG. 1 is a perspective view of an engine air valve.

Reference will now be made to the drawings wherein like reference numerals identify similar structural features or aspects of the subject invention. For purposes of explanation and illustration, and not limitation, a partial view of an exemplary embodiment of an engine air valve in accordance with the invention is shown in FIG. 1 and is designated generally by reference character 100. Other embodiments of the engine air valve in accordance with the invention, or aspects thereof, are provided in FIG. 2, as will be described. The system of the invention can be used to decrease eccentricity and heat transfer between shafts threaded together.

FIG. 1 shows an engine air valve 100 for metering compressor air flow to an engine. The air valve 100 includes a fueldraulic actuator 102 connected to a fuel side of a combination shaft 104 for transmitting power to a poppet valve 106 configured to control airflow within an air inlet duct 108. The valve 100 is disposed within an engine control system of an aircraft.

Figure 2:
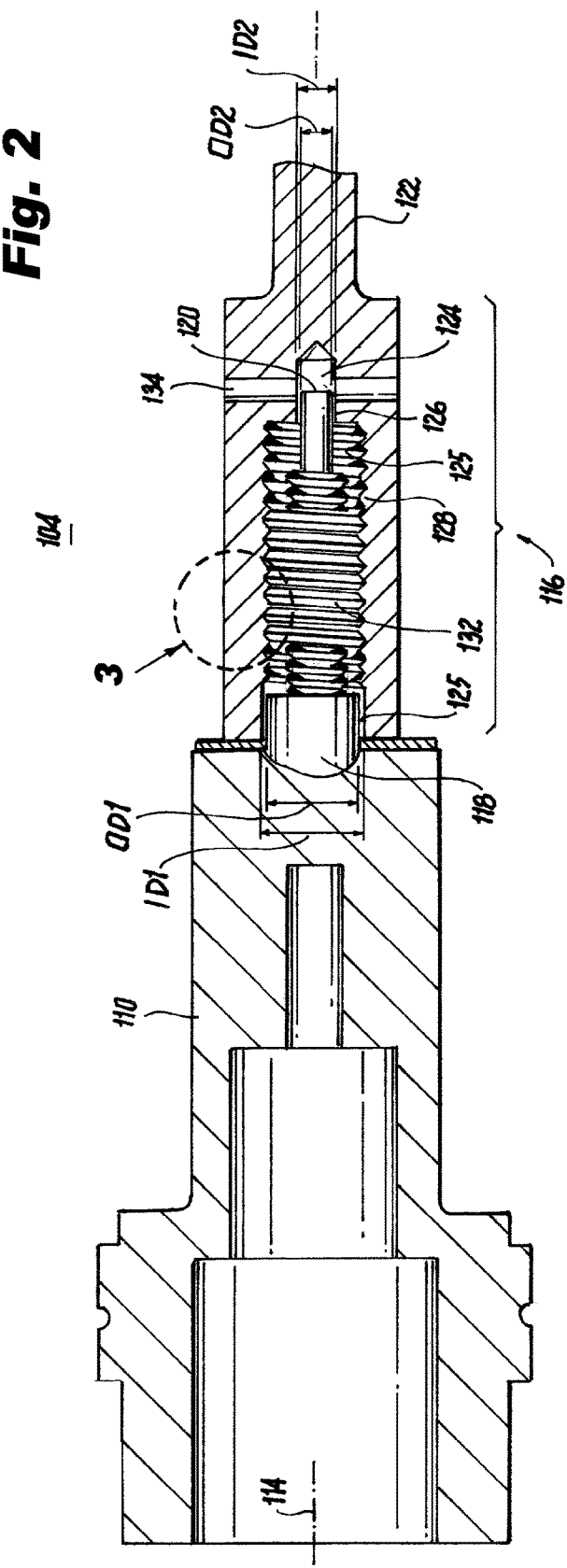
FIG. 2 is a side view of a portion of FIG. 1, showing the combination shaft.

FIG. 2 shows the details of the combination shaft 104. The combination shaft 104 includes a first shaft 110. The first shaft 110 defines a primary axis 114 and includes an axial protrusion 116. The axial protrusion 116 includes a first circumferential surface 118 defining a first outer diameter OD1 and a second circumferential surface 120 defining a second outer diameter OD2. A second shaft 122 includes a cavity 124 therein configured to receive at least a portion of the axial protrusion 116. The second shaft 122 defines a first inner portion 125 with a first inner diameter ID1 and a second inner portion 126 with a second inner diameter ID2. Both the first shaft 110 and the second shaft 122 can be tubular.

Figure 3:
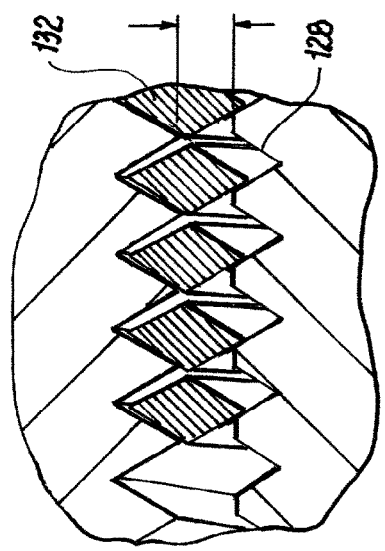
FIG. 3 is a side view of a portion of FIG. 2, showing the locking insert.

A threaded connection 128 (shown in detail in FIG. 3) is used to connect the first shaft 110 and the second shaft 122 and configured to restrict relative axial movement of the first shaft 110 and the second shaft 122. The threaded connection 128 allows the first shaft 110 and the second shaft 122 to be loosely threaded together, while preventing the second shaft 122 from sliding off the first shaft 110. The threaded connection 128 separates the surface defined by first outer diameter OD1 of the first shaft 110 axially from the surface defined by the second outer diameter OD2. The threaded connection 128 can provide radial clearance at the threads, to allow centering diameter to engage each other without binding. Further reduction in the major diameter can be done if structural analysis permits. It is also considered that the major diameter of the male thread can be machined to the maximum minor diameter for the female thread. This allows greater clearance for radial motion between threaded features.

Further shown in FIG. 2, a centering feature defined by the protrusion 116 of the first shaft 110 restricts relative radial movement of the first shaft 110 and the second shaft 122. The second shaft 122 is concentrically aligned within the first shaft 110. The centering feature helps maintain the concentricity of the two shafts 110, 122. The second outer diameter OD2 of the first shaft 110 and the second inner diameter ID2 of the second shaft define a clearance of greater than zero and less than 0.001 inches, preferably within 0.0005 inches.

Referring further to FIG. 2, a first section of the centering feature defines the first outer diameter OD1 and a second concentric section defines the second outer diameter OD2. The cavity 124 within the second shaft 122 includes a first section defining the first inner diameter ID1 and a second section defining the second inner diameter ID2. The second inner diameter ID2 is smaller than the first inner diameter ID1 and the first outer diameter OD1 of the first shaft 110 is greater than the second outer diameter OD2.

A locking insert 132 (shown in FIG. 3) is located between the first outer diameter OD1 of the first shaft 110 and the first inner diameter ID1 of the second shaft 122. The locking insert 132 can include a stainless steel wire. Locking insert 132 is used to provide secondary retention, the primary retention being torque. The locking 132 insert prevents the threaded features from backing off in the event the torque is lost and also provides a thermal resistive path.

The first shaft 110 includes a material having a lower melting point than a material of the second shaft 122. The first shaft 110 can include titanium and the second shaft 122 can include Inconel. The difference in heat conductivity allows the combination shaft 104 handle the two different environments of either side of the combination shaft 104. In order to further help handle the heat, the second shaft 122 includes a through hole 134 arranged perpendicular to the primary axis and configured to provide cooling to the centering feature. Cooling air can enter the through hole 134 from a cooler ambient environment.

The methods and systems of the present disclosure, as described above and shown in the drawings provide for a reliable and cost effective way to connect two threaded shafts. While the apparatus of the subject disclosure have been showing and described with reference to embodiments, those skilled in the art will readily appreciate that changes and/or modifications may be made thereto without departing from the spirit and score of the subject disclosure.

What is claimed is:

1. A combination shaft for transmitting power comprising:
a first shaft including an axial protrusion including a first circumferential surface defining a first outer diameter and a second circumferential surface defining a second outer diameter, configured to attach to be driven by a piston; and
a second shaft having a cavity therein configured to receive at least a portion of the first shaft and being configured to drive an air valve, having internal threads, and defining at least a first inner radial surface having a first inner diameter and a second inner radial surface having a second inner diameter, the internal threads being engagable with the external threads to prevent axial movement between the first shaft and the second shaft and the first inner radial surface being engagable with the first outer radial surface and the second inner radial surface being engagable with the second outer radial surface to provide radial centering of the first shaft to the second shaft; and further comprising a locking insert located between the first outer diameter of the first shaft and the first inner diameter of the second shaft.

2. The combination shaft of claim 1, wherein the second shaft is concentrically aligned within the first shaft.

3. The combination shaft of claim 1, wherein the first shaft includes a material having a lower melting point than a material of the second shaft.

4. The combination shaft of claim 3, wherein the first shaft includes titanium and the second shaft includes Inconel.

5. The combination shaft of claim 1, wherein the second outer diameter of the first shaft and the second inner diameter of the second shaft define a clearance of greater than zero and less than 0.0005 inches.

6. The combination shaft of claim 1, wherein the locking insert includes a stainless steel wire.

7. The combination shaft of claim 1, wherein the protrusion of the shaft includes a first section defining the first outer diameter and a second concentric section defining the second outer diameter configured to fit within the cavity of the second shaft.

8. The combination shaft of claim 7, wherein the cavity of the second shaft includes a first section defining the first inner diameter and a second section defining the second inner diameter.

9. The combination shaft of claim 7, wherein the second inner diameter of the second shaft is smaller than the first inner diameter of the second shaft.

10. The combination shaft of claim 7, wherein the first outer diameter of the first shaft is greater than the second outer diameter of the first shaft.

11. The combination shaft of claim 1, wherein the external threads of the first shaft separate axially the first outer diameter and the second outer diameter of the first shaft.

12. A combination shaft for transmitting power comprising: a first shaft including an axial protrusion including a first circumferential surface defining a first outer diameter and a second circumferential surface defining a second outer diameter, configured to attach to be driven by a piston; and
a second shaft having a cavity therein configured to receive at least a portion of the first shaft and being configured to drive an air valve, having internal threads, and defining at least a first inner radial surface having a first inner diameter and a second inner radial surface having second inner diameter, the internal threads being engagable with the external threads to prevent axial movement between the first shaft and the second shaft and the first inner radial surface being engagable with the first outer radial surface and the second inner radial surface being engagable with the second outer radial surface to provide radial centering of the first shaft to the second shaft, wherein the second shaft includes a through hole arranged perpendicular to a primary axis of the second shaft configured to provide cooling to the centering feature.

13. An engine air valve for metering compressor flow to an engine comprising:
   a fueldraulic actuator connected to a fuel side of a combination shaft for transmitting power to a poppet valve configured to control airflow within an air inlet duct wherein the combination shaft includes:
a first shaft including an axial protrusion including a first circumferential surface defining a first outer diameter and a second circumferential surface defining a second outer diameter, configured to attach to be driven by a piston defining a primary axis; and
   a second shaft configured to drive an air valve including having a cavity therein configured to receive at least a portion of the axial protrusion of the first shaft and being configured to drive an air valve, having internal threads, and defining at least a first inner radial surface having a first inner diameter and a second inner radial surface having second inner diameter, the internal threads being engagable with the external threads to prevent axial movement between the first shaft and the second shaft and the first inner radial surface being engagable with the first outer radial surface and the second inner radial surface being engagable with the second outer radial surface to provide radial centering of the first shaft to the second shaft; and further comprising a locking insert located between the first outer diameter of the first shaft and the first inner diameter of the second shaft.

14. The engine air valve of claim 13, wherein the valve is disposed within an engine control system of an aircraft.

* * * * *